US012615203B2

(12) United States Patent
Achkinazi

(10) Patent No.: US 12,615,203 B2
(45) Date of Patent: Apr. 28, 2026

(54) MULTIPATH WEIGHTING USING METRICS FROM ONE OR MORE PROTOCOLS

(71) Applicant: DELL PRODUCTS L.P., Round Rock, TX (US)

(72) Inventor: Igor Achkinazi, Northboro, MA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 18/656,398

(22) Filed: May 6, 2024

(65) Prior Publication Data

US 2025/0343752 A1      Nov. 6, 2025

(51) Int. Cl.
*G06F 15/173* (2006.01)
*H04L 45/00* (2022.01)
*H04L 45/12* (2022.01)
*H04L 67/1008* (2022.01)

(52) U.S. Cl.
CPC ............ *H04L 45/123* (2013.01); *H04L 45/38* (2013.01); *H04L 67/1008* (2013.01)

(58) Field of Classification Search
None
See application file for complete search history.

(56) References Cited

U.S. PATENT DOCUMENTS

2012/0307629 A1* 12/2012 Vasseur ................... H04L 45/24
370/228
2018/0097725 A1* 4/2018 Wood ...................... H04L 45/50
2023/0017632 A1* 1/2023 Herb ................... G06F 11/3006
2023/0059537 A1* 2/2023 Gavand ............... H04L 67/1006

OTHER PUBLICATIONS

"The FRRouting Protocol Suite," [online], [Retrieved Apr. 15, 2024]. Retrieved from Internet <URL: https://github.com/FRRouting/frr> (6pgs).

* cited by examiner

*Primary Examiner* — Wing F Chan
*Assistant Examiner* — Andrew Woo
(74) *Attorney, Agent, or Firm* — BAUGH LAW, LLC

(57) ABSTRACT
Embodiments herein comprise obtaining states of network links of paths from an initiator (e.g., host) to a target (e.g., storage subsystem) to determine weight factors for the paths in a multipath scenario between the initiator and the target. Given the weight factors, they may be used with an NVMe initiator implementation of a multipath weight/load-balancing methodology or system to distribute workloads (e.g., IO tasks/requests) across the paths of the set of paths in the multipath. In one or more embodiments, each state may have a metric associated with it, which may act as a cost or be used to determine/assign a cost to the corresponding link. In one or more embodiments, one or more additional rules may be set for converting metrics to costs, costs and/or metrics to weights, and/or for distributing the workloads.

20 Claims, 9 Drawing Sheets

100

Obtain from a link state protocol a set of one or more metrics for each path of a set of paths in a network that connects a host and a storage subsystem ⟋ 105

For each path of the multiple paths, use at least one of the metrics from the set of metrics obtained from the link state protocol to determine a weight factor for path ⟋ 110

Distribute one or more workloads (e.g., fulfillment of data traffic tasks) to one or more paths in the set of paths using the weight factors of the paths ⟋ 115

<u>100</u>

<u>300</u>

Use one or more of the metrics to determine a cost value for each link of a path ⌐ 305

For each path, use its link cost values to obtain a path cost value ⌐ 310

Assign a weight factor to the path related to the path cost values ⌐ 315

_400_

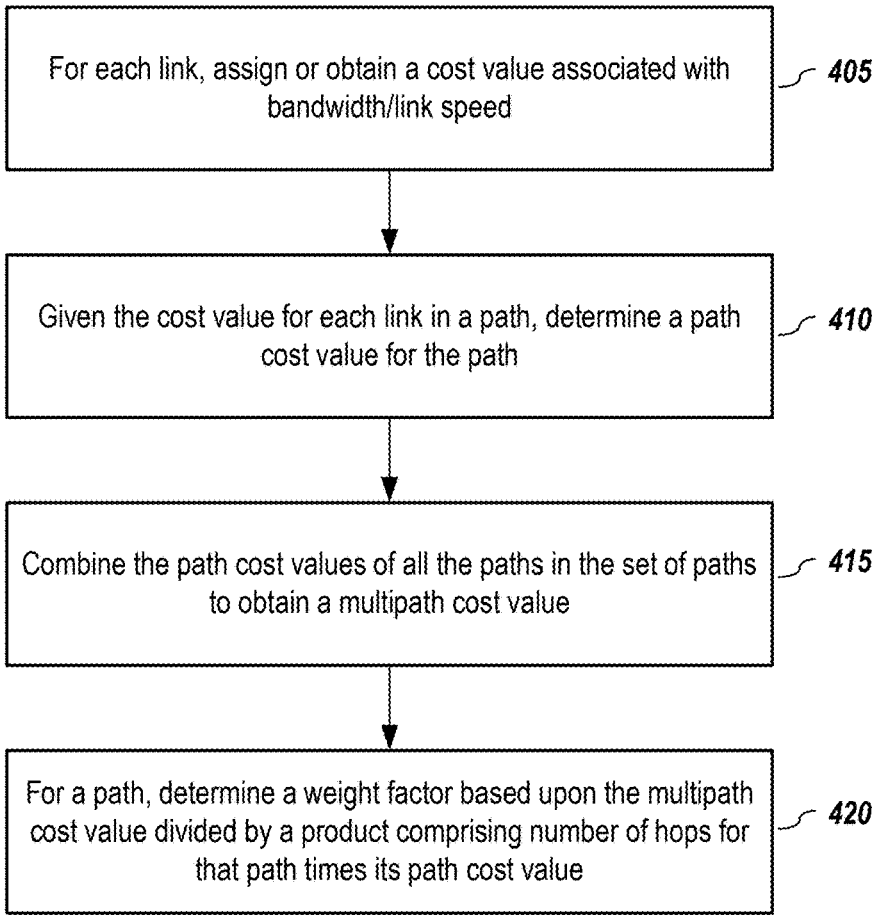

For each link, assign or obtain a cost value associated with bandwidth/link speed     405

Given the cost value for each link in a path, determine a path cost value for the path     410

Combine the path cost values of all the paths in the set of paths to obtain a multipath cost value     415

For a path, determine a weight factor based upon the multipath cost value divided by a product comprising number of hops for that path times its path cost value     420

Responsive to detecting or identifying a change in the network (e.g., change to one or more metrics, structural change to the network, and/or functional change to the network), update weight factors ⟋ 705

Use the updated weight factors to distribute one or more workloads (e.g., one or more distribute I/O tasks) to one or more of the paths ⟋ 710

_800_

<u>900</u>

MULTIPATH WEIGHTING USING METRICS FROM ONE OR MORE PROTOCOLS

BACKGROUND

A. Technical Field

The present disclosure relates generally to information handling systems. More particularly, the present disclosure relates to handling of data traffic in a multipath environment.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One common use of information handling systems is in data storage systems. One example of a storage network is an NVMe storage system. An NVMe storage system uses Non-Volatile Memory Express® (NVMe®) technology, which is specifically designed to leverage the performance benefits of solid-state drives (SSDs). These SSDs are significantly faster than traditional hard disk drives (HDDs) and even older SSDs. Multiple SSDs may be combined in arrays or clustered configurations to meet the demands of large-scale storage deployments, cloud environments, and data-intensive applications.

In storage area networks (SANs), a host (or initiator) interacts with a storage subsystem, which may be an SSD or set of SSDs. A SAN implementation may use NVMe over Fabrics (NVMe-oF), which extends the benefits of NVMe technology across a network, allowing remote access to NVMe storage devices with low latency and high throughput. This enables the creation of distributed storage architectures and facilitates the integration of NVMe storage systems into existing data center infrastructures.

An NVMe storage system may be configured as a distributed system with multiple target interfaces, and information handling systems may be connected to several of them for I/O load balancing, bandwidth utilization, and congestion avoidance. One of important issues of multipath methods is how to distribute I/O loads between different paths of multipaths.

Typical traditional approaches use administrative knowledge of network configuration. A common approach is to have an expert, such as a skilled administrator, configure load balancing by assigning values to each path of a multipath set for hashing of the I/O flow. However, such an approach has significant drawbacks. First, it relies heavily upon the administrator and that person's skill and input. Second, it is manual, which means that it can be labor intensive and non-dynamic. Third, such approaches may be acceptable if the NVMe initiator and the NVMe target are directly connected. However, in complicated networks—where links are being added and deleted, or traffic from the initiator to the target is being rerouted based on network conditions—it becomes a tedious and cumbersome task.

Accordingly, it is highly desirable to have new, more efficient and dynamic ways to handle data traffic in multipath environments.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 4 depicts an alternative methodology for obtaining the weight factors, according to embodiments of the present disclosure.

DETAILED DESCRIPTION OF EMBODIMENTS

Figure 1:
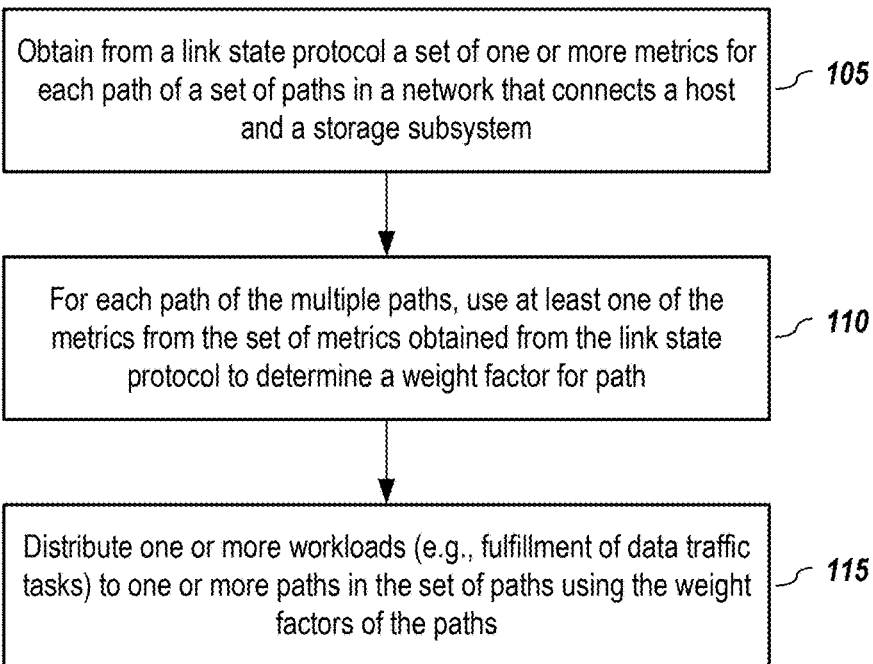
FIG. 1 ("FIG. 1") depicts a method for determining and using weight factors in a multipath system, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of NVMe networks or storage area networks, aspects of the present disclosure are not so limited. Accordingly, the aspects of the present disclosure may be applied or adapted for use in other contexts.

A. General Introduction

One standard in storage that is gaining in adoption in industry is Non-Volatile Memory Express (NVMe®) over Fabrics (NVMe-oF). NVMe® is a protocol or family of specifications designed for accessing solid-state drives (SSDs). The NVMe® family of specifications define how a host (or initiator) communicates with non-volatile memory across one or more transports, such as Peripheral Component Interconnect Express (PCIe), Remote Direct Memory Access (RDMA), Transmission Control Protocol (TCP), among other protocols. NVMe® specifications are directed to modern SSDs—providing lower latency and higher I/O (input/output) operations per second (IOPS) compared to older protocols like SATA and SAS, which were initially designed for spinning hard disk drives (HDDs). The results include faster data transfer speeds and improved overall system performance, especially in tasks that involve heavy data processing or storage operations.

An NVMe storage system may be configured as a distributed system with multiple NVMe target interfaces. Application information handling system may connect to several of them for I/O load balancing, bandwidth utilization, and congestion avoidance. In such networks, there may be multiple pathways from an initiator to a storage subsystem. Given multipath situations, there are different ways to handle traffic flows. One important issue of multipath methods is how to distribute I/O loads between different paths of a multipath set.

As noted above, typical traditional approaches use administrative knowledge of network configuration to devise an approach for distributing data traffic across the paths of a multipath. However, such an approach has significant drawbacks. First, it relies heavily upon the user and user input. Second, it is manual, which means that it can be labor intensive and non-dynamic. Third, such approaches may be acceptable if the NVMe initiator and the NVMe target are directly connected. However, in complicated networks—where links are being added and deleted, or traffic from the initiator to the target is being rerouted based on network conditions—it becomes a tedious and cumbersome task.

While storage network administrator can monitor and reconfigure multipaths distributions according to new network states, it is greatly preferred to automate the process, where weights for distributing I/O requests to pathways may be updated automatically as network conditions change. Dynamically adapting to changes in the network allows for multipath hashing based on network conditions to avoid link congestions and starvations along the paths from an NVMe initiator to an NVMe target.

Accordingly, embodiments herein provide for and support weighted multipath policies. By using one or more metrics to assign weights to pathways, assignment of data traffic (e.g., I/O requests) may be dynamically performed. For example, assignment may be configured according to outgoing paths throughput (e.g., the higher the throughput, the higher the weight of the path, and the higher the probability multipath forwarding engine will put outgoing packets onto it); however, additional metrics may be used. It should be noted that there are additional benefits besides the ease and dynamic nature of its implementation. Another benefit of embodiments is that they provide a common standard that allows application servers to access the storage without having to install any special agent.

B. Systems and Methods Embodiments

Embodiments herein comprise obtaining states of network links of paths from an initiator (e.g., host) to a target (e.g., storage subsystem) to determine weight factors for the paths in a multipath scenario between the initiator and the target. Given the weight factors, they may be used with an NVMe initiator implementation of a multipath weight/load-balancing methodology or system to distribute workloads (e.g., I/O tasks) across the paths of the set of paths in the multipath. In one or more embodiments, each state may have a metric associated with it, which may act as a cost or be used to determine/assign a cost to the corresponding link. In one or more embodiments, one or more additional rules may be set for converting metrics to costs, costs and/or metrics to weights, and/or for distributing the workloads. For example, one rule for a metric may be as follows: the higher the throughput of a link, the lower the cost is for that link.

IP routing has mechanisms, which may be referred to as link state protocols, of calculating the state of links along a path from a source to the destination. Embodiments herein comprise integrating NVMe protocol(s) and one or more link state protocols for the benefit of properly scheduling NVMe multipath workloads (e.g., I/O loads).

In one or more embodiments, to build a map of network link states of a path, embodiments may use one or more intra-domain link-state routing protocols—such as OSPF (Open Shortest Path First, which is a routing protocol used in IP networks to determine the best path for routing packets based on a shortest path first (SPF) method, which calculates the shortest path to each destination network), ISIS (Intermediate System to Intermediate System, which is a routing protocol used to enable routers to dynamically exchange routing information in large-scale IP networks), or other protocol capable of obtaining one or more metrics related links of a path or of a path.

In one or more embodiments, an instance of such protocol(s) running on the same node collocated with an NVMe initiator can dynamically update the NVMe initiator about states of all links to a given path destination (i.e., to an NVMe target). Changes in one or more of the links along the path from the NVMe initiator to the NVMe target and the states of those links (e.g., up/down/bandwidth upgrade or downgrade) may be automatically propagated to the NVMe initiator and used in a multipath policy module for new hash calculation.

It should be noted that distance-vector routing protocols usually calculate only number of hops to the destination as a cost of the path without taking metrics like link bandwidth into account. While such protocols may be used to gather one or more metrics, link-state based routing protocols such as OSPF and ISIS, provide other metrics/costs values. For example, link state protocols may collect or use a number of metrics, including but not limited to:

Bandwidth metric—the cost may be related to or based upon the bandwidth of the link, in which lower bandwidth links have higher costs.

Interface Type—Interface type (e.g., Ethernet, serial, etc.), which may have predefined costs associated with them, may be considered when calculating or assessing a cost.

Administrator Weight—Administrators may also manually configure weights to influence path selection.

Link State—Networking information handling systems (e.g., switches or routers that support link state protocols) may exchange link state information to build a topology map of the network. This information may include the status and characteristics of links.

Switch/Router ID—Networking information handling systems (e.g., switches or routers that support link state protocols) have unique IDs used for identification within a link state protocol domain (e.g., within an OSPF domain). These IDs may be used to play a role in route selection (e.g., breaking ties between paths with equal weights or costs).

Neighborship State—Networking information handling systems (e.g., switches or routers that support link state protocols) may establish neighbor relationships with adjacent devices to exchange routing information. The state of these neighbor relationships may be a metric used to affect cost and path selection decision-making.

Data centers may use other protocols as well (e.g., BGP (Border Gateway Protocol), which is usually used for inter-domain routing (i.e., routes exchange between separate routing domains)), where networks have different level of hierarchy or tiers. Note that BGP does not, however, operate with link states. It shall be noted that embodiments may consider that there are no network clouds or private networks present in the setup, tunnelling, or network address translations (e.g., NAT). However, embodiments may be configured to address these additional considerations by collecting the relevant information for link and path weight factor determination.

FIG. 1 depicts a method for determining and using weight factors in a multipath system, according to embodiments of the present disclosure. In one or more embodiments, a link state protocol may be used to obtain (105) a set of one or more metrics for each path of a set of paths in a network that communicatively connects a host and a storage subsystem. For each path of the multiple paths, one or more of the metrics from the set of metrics obtained from the link state protocol may be used (110) to determine a weight factor for a path. Finally, when distributing fulfillment of one or more workloads to one or more paths in the set of paths, the weight factors of the paths may be used (115) to ensure proper distribution.

Figure 2:
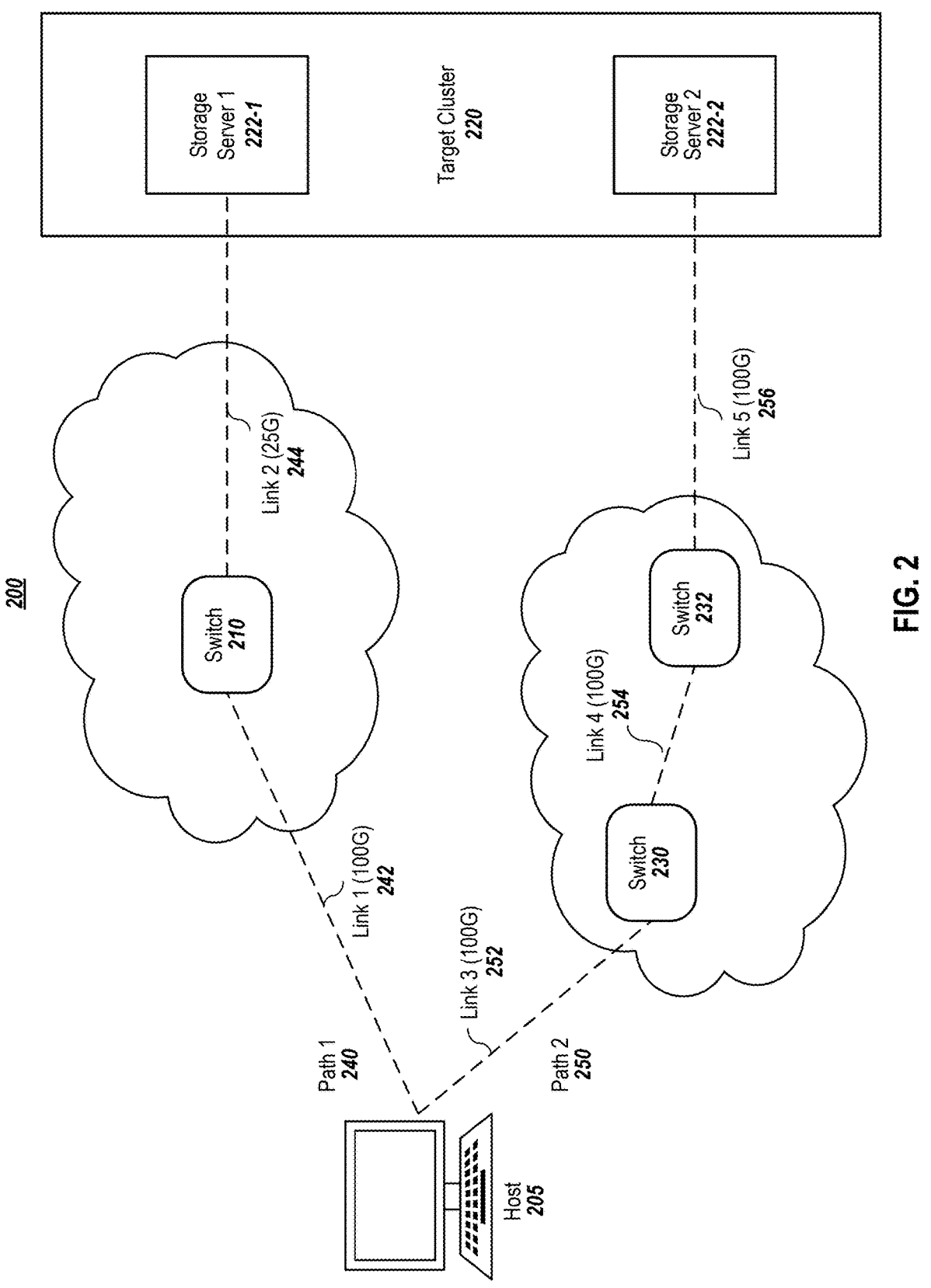
FIG. 2 depicts a network with multiple paths between a host and a storage target cluster, according to embodiments of the present disclosure.

Consider, by way of illustration and not limitation, the example of FIG. 2. FIG. 2 depicts a network with multiple paths between a host and a storage target cluster, according to embodiments of the present disclosure.

As depicted, a host 205 is communicatively coupled to a target cluster 220 via two paths—path 1 240 and path 2 250. In one or more embodiments, the host may be an NVMe initiator and the target cluster 220 may be an NVMe target and may comprise one or more NVMe storage subsystems or servers 222. In one or more embodiments, the target cluster 220 may present multiple targets (e.g., storage server 1 222-1 and storage server 2 222-2) to the host 205 for redundancy; this storage cluster may be the same storage system but may have different storage servers. In one or more embodiments, these storage subsystems or storage servers 222 may have different endpoint Internet Protocol (IP) addresses as well as different paths.

In the depicted example, path 1 240 comprises two links—link 1 242, which is a 100 gigabit (G or Gb) link, and link 2 244, which is a 25G link. The links are connected via a networking information handling system (i.e., switch 210).

In the depicted example, path 2 comprises three links— link 3 252, which is a 100G link, link 4 254, which is a 100G link, and finally link 5 256, which is also a 100G link. These links are connected via two networking information handling systems (i.e., switch 230, which connects link 3 and link 4, and switch 232, which connects link 4 and link 5).

Figure 3:
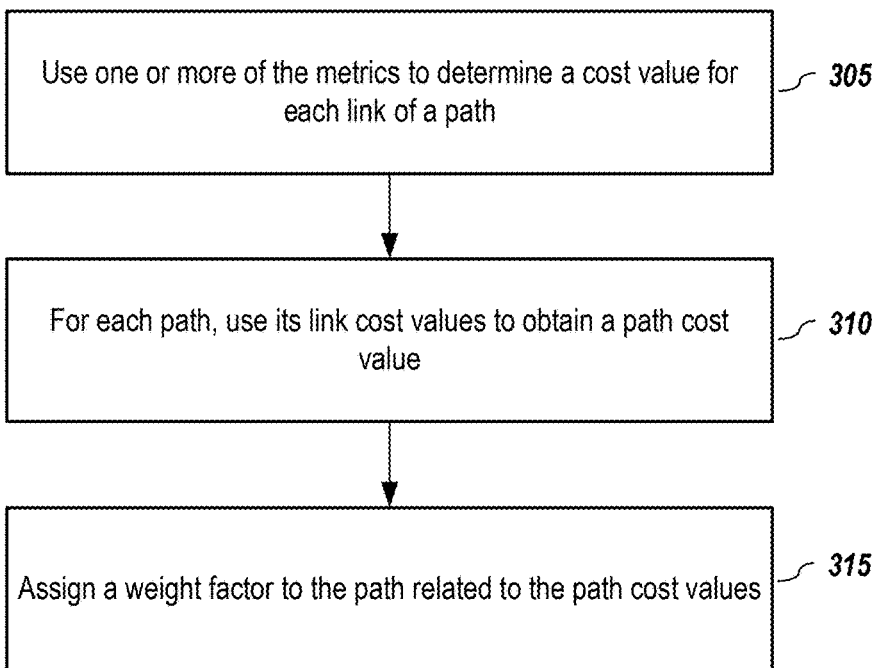
FIG. 3 depicts a methodology for obtaining the weight factors, according to embodiments of the present disclosure.

Concerning the step 110—for each path of the multiple paths, using at least one of the metrics from the set of metrics obtained from the link state protocol to determine a weight factor for path, FIG. 3 depicts a methodology for obtaining the weight factors, according to embodiments of the present disclosure.

In one or more embodiments, for each link of a path, one or more of the metrics may be used to determine (305) a cost value for the link. Consider the network in FIG. 2, embodiments may use one or more link-state routing protocols— such as OSPF or ISIS—to obtain one or more metrics. In one or more embodiments, one of the metrics may be a cost value, which may be (by way of illustration and not limitation) related to bandwidth, but may be related to one or more additional metrics/costs.

Given the cost or metric(s) per link, these values may be used to obtain (310) a path cost value for the path associated with those links. In one or more embodiments, the path cost value of a path may be a combination (e.g., a summation, statical summation, or other form of combination) of the costs of its links. Given the path cost values, these values may be used to obtain or assign (315) a weight factor for each of the paths. One skilled in the art shall recognize a number of different ways in which the path cost values may be used to obtain weighting factors. For example, the path cost values may be used as the weight factors. Alternatively, the path cost values may be used in one or more formulas or heuristics in which one or more additional factors are considered to obtain path cost values and/or to obtain final weight factors. Additional factors may include but are not limited to costs relative to other paths, interface types, historical traffic rates per link and/or per path, speeds of equipment (e.g., switch 210 is newer and faster than switch 232), number of additional connections to a networking device that may reduce its throughput, etc.)

Figure 5:
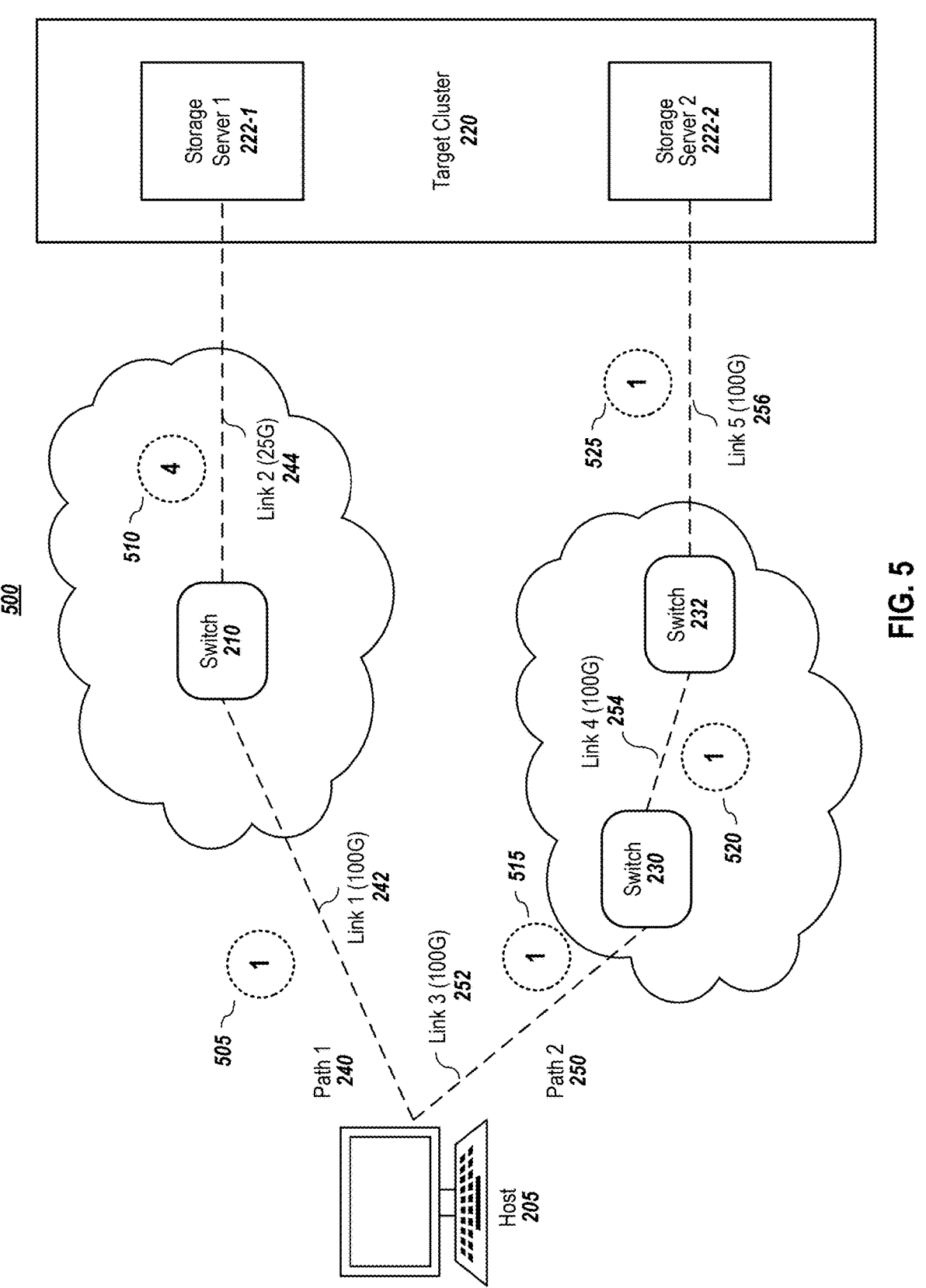
FIG. 5 depicts the network of FIG. 2 with example cost metrics associated with each link, according to embodiments of the present disclosure.

FIG. 4 depicts an alternative methodology for obtaining the weight factors, according to embodiments of the present disclosure. In one or more embodiments, each link is assigned a cost value, or a cost value is obtained (405), in which the cost value is associated with bandwidth/link speed. For example, a value may be assigned to each bandwidth. Assume that a 100G link has a cost/metric of 1 (i.e., as the fastest link with biggest throughput), other values may be related to that base value (e.g., a 25G link may have a cost of 4 (i.e., 100G/25G=4)) for the link. FIG. 5 depicts the networking 200 of FIG. 2 but with the bandwidth cost metrics associated with each link:

Path 1 (240):
   Link 1 (100G)—Cost metric=1 (505)
   Link 2 (25G)—Cost metric=4 (510)
Path 2 (250):
   Link 3 (100G)—Cost metric=1 (515)
   Link 4 (100G)—Cost metric=1 (520)
   Link 5 (100G)—Cost metric=1 (525)

Given the cost value for each link in a path, a path cost value may be determined (410) for the path. Assuming a summation of link costs/metrics embodiment, the path cost values may be obtained as follows:

$$\text{Path Cost Value}_1 = 1 + 4 = 5 \qquad \text{Path 1 (240)}$$
$$\text{Path Cost Value}_2 = 1 + 1 + 1 = 3 \qquad \text{Path 1 (250)}$$

Given the path cost values for each of the paths in the set of paths (i.e., the multipaths), the path cost values of all the paths in the set of paths may be combined (415) to obtain a multipath cost value. In one or more embodiments, the multipath cost value may be a summation of the paths. Continuing the example:

$$\text{Multipath Cost Value} = \sum\nolimits_{n} (\text{path cost values})_n, \text{ where } n = \# \text{ of paths}$$
$$\text{Multipath Cost Value} = \text{Path Cost Value}_1 + \text{Path Cost Value}_2$$
$$\text{Multipath Cost Value} = 5 + 3 = 8$$

In one or more embodiments, for a path in the set of paths, a weight factor may be based upon the multipath cost value divided by a product comprising number of hops for that path times its path cost value:

$$\text{Weight}_i = \frac{\sum\nolimits_{n} \text{path cost values}_n}{\text{number of path hops}_i * \text{path cost value}_i}$$
$$\text{where } i = \text{the path and } n = \# \text{ of paths.}$$

Continuing the example:

$$\text{Weight}_1 = \frac{8}{2*5} = \frac{8}{10} = 0.80$$
$$\text{Weight}_2 = \frac{8}{3*3} = \frac{8}{9} = 0.89$$

This gives a ratio of 0.89/0.8=1.11 for multipath forwarding engine hashing between those two paths in favor of path 2. That is, given that Weight$_2$ is higher than Weight$_1$, more workloads (i.e., data traffic/IO requests) may be assigned to path 2 than path 1. Note that path 2 of the multipath has higher weight even though it has more hops on the way to the destination NVMe target.

Note that this formula normalizes the given path cost and number of hops inversely proportionally to the cost of all links. Note also that this formula represents just one example of a method for obtaining a weighting factor. One skilled in the art shall recognize that different costs, metrics, formulas, and/or rules may be used to assign weight factors depending upon desired factors.

As noted above, one of the benefits of embodiments of the current patent documents is that it may be automated and dynamic. Embodiments may comprise feeding states of network links of the paths between the NVMe initiator to an NVMe target into an NVMe initiator implementation of multipath weight methodology. As the network changes, the weight factors may be dynamically updated.

Examples of changes to the network may include, but are not limited to a change to one or more metrics of one or more links, a change to one or more metrics of one or more paths, one or more structural changes to the network (e.g., new link added, link removed, link down, new pathways, etc.), and one or more functional changes (e.g., link speed changed) to the network.

Figure 6:
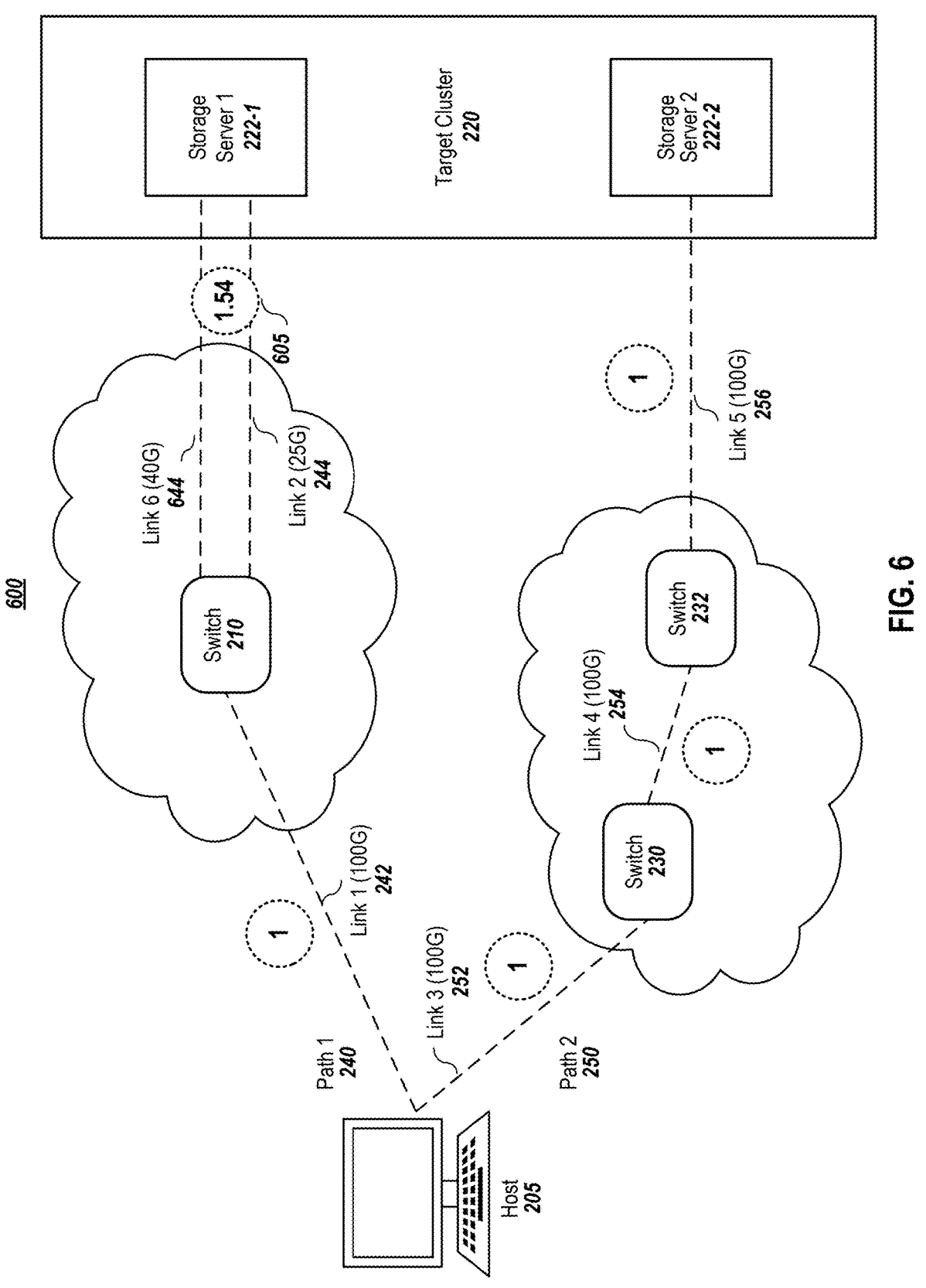
FIG. 6 depicts the network of FIG. 2 in which a change has been made to the network that affects the multipaths between a host and a storage target cluster, according to embodiments of the present disclosure.

FIG. 6 depicts the network of FIG. 2 in which a change has been made to the network that affects the multipaths between a host and a storage target cluster, according to embodiments of the present disclosure. Note that a new link, link 6 644, was added between switch 210 and the storage server 222-1.

Figure 7:
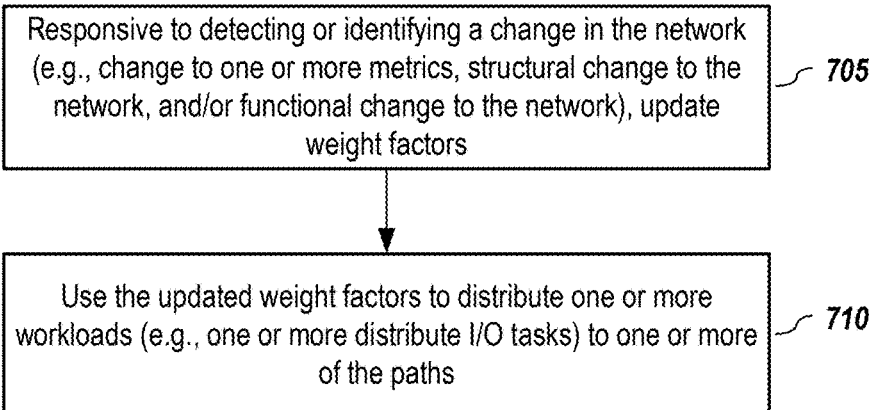
FIG. 7 depicts a methodology for dynamically updating the weight factors, according to embodiments of the present disclosure.

FIG. 7 depicts a methodology for dynamically updating the weight factors, according to embodiments of the present disclosure. In one or more embodiments, responsive to detecting or identifying a change, the weight factors are updated (705). Consider, by way of illustration and not limitation, the example of FIG. 6.

In one or more embodiments, the link 6 state is automatically propagated to the NVMe initiator (i.e., host 205) and passed into multipath policy module for new hash calculation. Link 6 has been added and is a 40G link. In one or more embodiments, the parallel links of link 2 and link 6 may be treated as a single link with the sum of their bandwidths. By contrast, if the new link were serially connected, in one or more embodiments, it would be treated as a separate link with an added hop as well. To continue the example from above about FIG. 5, the combined bandwidth cost for links 2 and 6 would be 100G/(25G+40G)=1.54 605. The link costs are now as follows:

Path 1 (240):
    Link 1 (100G)—Cost metric=1
    Link 2+Link 6 (65G)—Cost metric=1.54
Path 2 (250):
    Link 3 (100G)—Cost metric=1
    Link 4 (100G)—Cost metric=1
    Link 5 (100G)—Cost metric=1

Given the cost value for each link in a path, a path cost value may be determined for the path. Assuming a summation of link costs/metrics embodiment, the path cost values may be obtained as follows:

$$Path\ Cost\ Value_1 = 1 + 1.54 = 2.54 \qquad Path\ 1\ (240)$$

$$Path\ Cost\ Value_2 = 1 + 1 + 1 = 3 \qquad Path\ 2\ (250)$$

Given the path cost values for each of the paths in the set of paths (i.e., the multipaths), the path cost values of all the paths in the set of paths may be combined to obtain a multipath cost value. Continuing the example:

$$Multipath\ Cost\ Value = Path\ Cost\ Value_1 + Path\ Cost\ Value_2$$

$$Multipath\ Cost\ Value = 2.54 + 3 = 5.54$$

The weight factors may be as follows, continuing the example:

$$Weight_1 = \frac{5.54}{2*2.54} = 1.1$$

$$Weight_2 = \frac{5.54}{3*3} = \frac{8}{9} = 0.62$$

Note that path 1 links total cost will be 2.54 since there are two (2) parallel links adding up to 65G, while path 2's total cost remained at 3. According to the example formula for determining weights, the NVMe initiator will path 1 of the multipath, given it has a bigger weight factor relative to path 2.

Following updating of the weight factors, the updated weight factors may be used (710) to distribute one or more workloads to one or more of the paths.

In one or more embodiments, an instance of a link-state protocol may operate on each node in the storage network to provide live updates of link states to the NVMe initiator node. With updated information, the weight factors may be dynamically updated. Note that the link-state routing protocol(s) should be installed as they will be also used for routing the IO loads, which comprise TCP/IP data traffic, from the NVMe initiator network node to the NVMe target network node. In one or more embodiments, given that the nodes in the network are already running one or more link-state routing protocols, and no additional instance of a routing protocol is required-thereby making deployment easy and lightweight. One skilled in the art shall recognize other benefits of one or more of the embodiments of the present patent document.

C. Information Handling System Embodiments and Other Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 8:
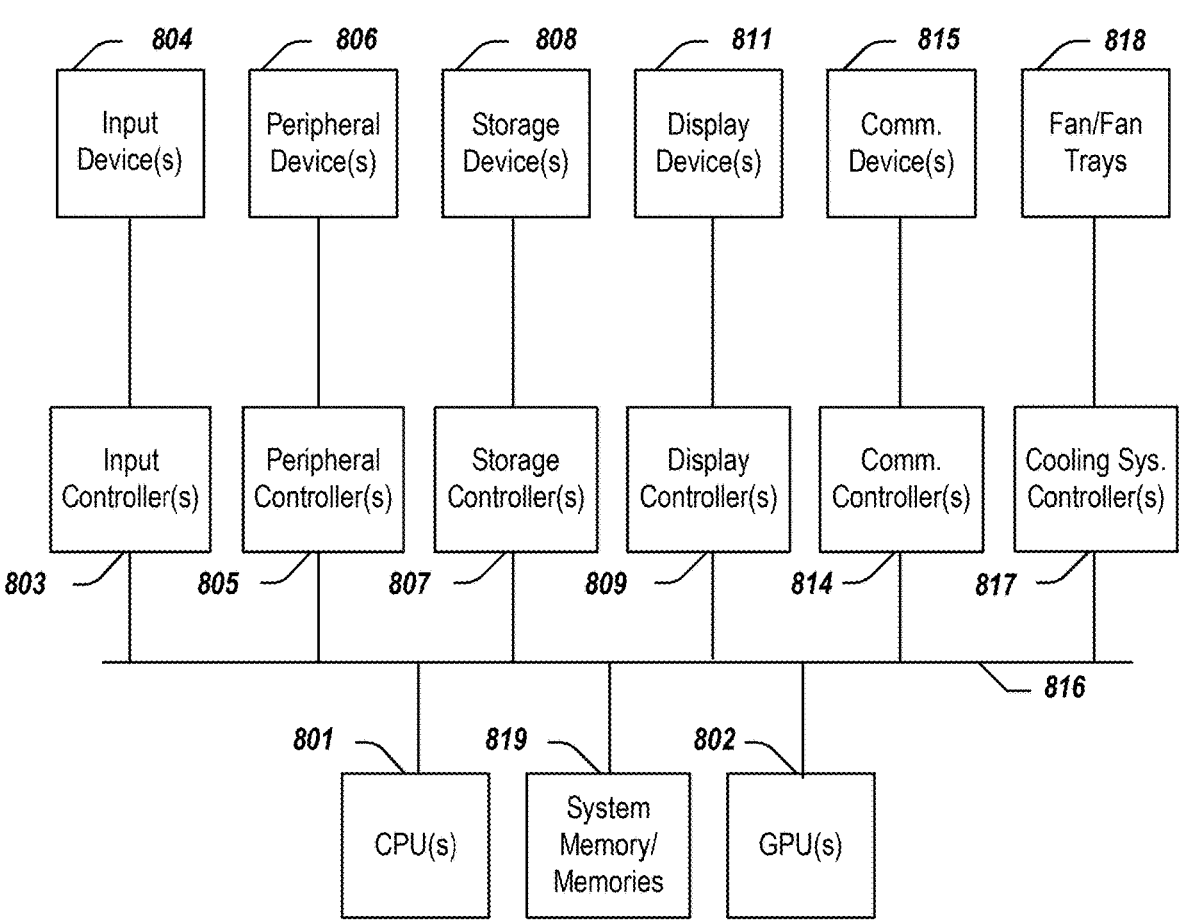
FIG. 8 depicts a simplified block diagram of an information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like and may also include one or more graphics processing units (GPU) 802 and/or a floating-point coprocessor for mathematical computations. In one or more embodiments, one or more GPUs 802 may be incorporated within the display controller 809, such as part of a graphics card or cards. In one or more embodiments, the system may alternatively or additionally include one or more data processing units (DPUs) (not shown). In the realm of data centers and cloud computing, a DPU refers to a specialized processing unit designed to accelerate data processing tasks. DPUs are typically optimized for handling data-centric workloads such as networking, storage, security, and other tasks related to data processing and manipulation. DPUs often offload specific tasks from a main CPU, allowing for improved performance, efficiency, and scalability in data-intensive applications. They may include specialized hardware components and dedicated software to efficiently process and manage data flows within a system. The system 800 may also include a system memory 819, which may comprise RAM, ROM, or both.

A number of controllers and peripheral devices may also be provided, as shown in FIG. 8. An input controller 803 represents an interface to various input device(s) 804, such as a keyboard, mouse, touchscreen, stylus, microphone, camera, trackpad, display, etc. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fibre Channel over Ethernet (FCOE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 9:
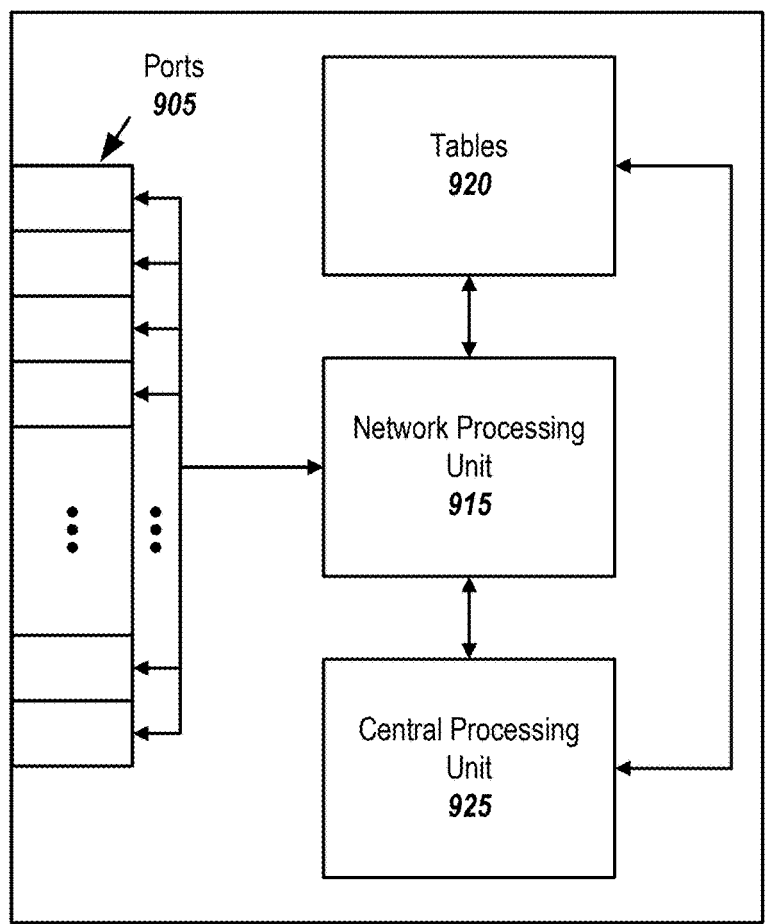
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure although it shall be understood that such system may be differently configured and include different components, additional components, or fewer components.

The information handling system 900 may include a plurality of I/O ports 905, a network processing unit (NPU) 915, one or more tables 920, and a CPU 925. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method comprising:

obtaining, via a link state protocol, a set of one or more link-state metrics for each path of a set of paths in a network that communicatively connects a host, which operates as a non-volatile memory express-over-Fabric (NVMe-oF) initiator, and a storage subsystem, which operates as a NVMe target;

using one or more of the link-state metrics from the sets of one or more link-state metrics obtained via the link state protocol to determine a weight factor for each path of the set of paths; and distributing one or more input/output (I/O) tasks involving the host and the storage subsystem to one or more paths in the set of paths using the weight factors of the paths in the set of paths.

2. The processor-implemented method of claim 1 wherein the step of distributing one or more input/output (I/O) tasks involving the host and the storage subsystem to one or more paths in the set of paths using the weight factors of the paths in the set of paths comprises:

hashing, using the weight factors, to determine a path on which to distribute one or more input/output tasks.

3. The processor-implemented method of claim 1 wherein the step of using one or more of the link-state metrics from the sets of one or more link-state metrics obtained via the link state protocol to determine a weight factor for each path of the set of paths comprises:

for each path, using one or more of the link-state metrics to determine a cost value for the respective path;

for each path, assigning the weight factor to the respective path using its cost value; and using the weight factors of the set of paths to distribute the one or more I/O tasks across the set of paths.

4. The processor-implemented method of claim 1 wherein the step of using one or more of the link-state metrics from the sets of one or more link-state metrics obtained via the link state protocol to determine a weight factor for each path of the set of paths comprises:

for each link of a path, assigning or obtaining a cost value associated with one or more link-state metrics for the link, in which at least one of the one or more link-state metrics for the link is related to bandwidth;

given the cost value for each link in a path, determining a path cost value for the path;

combining the path cost values of all the paths in the set of paths to obtain a multipath cost value; and for a path in the set of paths, determining a weight factor based upon the multipath cost value divided by a product comprising number of hops for that path times its path cost value.

5. The processor-implemented method of claim 1 further comprising:

responsive to detecting or identifying a change, updating weight factors; and using the updated weight factors to distribute one or more I/O tasks to one or more of the paths of the set of paths.

6. The processor-implemented method of claim 5 wherein the change comprises one or more of the following comprising:

a change to one or more link-state metrics of one or more links;

a change to one or more link-state metrics of one or more paths;

a structural change to the network; and a functional change to the network.

7. The processor-implemented method of claim 6 wherein the change comprises:

an addition of a new path, and the set of paths includes the new path as a member;

removal or inoperability of a path in the set of paths; or both.

8. An information handling system comprising:

one or more processors; and a non-transitory computer-readable medium or media comprising one or more sets of instructions which, when executed by at least one of the one or more processors, causes steps to be performed comprising:

obtaining, via a link state protocol, a set of one or more link-state metrics for each path of a set of paths in a network that communicatively connects the information handling system, which operates as a non-volatile memory express-over-Fabric (NVMe-oF) initiator, and a storage subsystem, which operates as a NVMe target;

using one or more of the link-state metrics from the sets of one or more link-state metrics obtained via the link state protocol to determine a weight factor for each path of the set of paths; and distributing one or more input/output (I/O) tasks involving the information handling system and the storage subsystem to one or more paths in the set of paths using the weight factors of the paths in the set of paths.

9. The information handling system of claim 8 wherein the step of distributing one or more input/output (I/O) tasks involving the information handling system and the storage subsystem to one or more paths in the set of paths using the weight factors of the paths in the set of paths comprises:

hashing, using the weight factors, to determine a path on which to distribute one or more input/output tasks.

10. The information handling system of claim 8 wherein the step of using one or more of the link-state metrics from the sets of one or more link-state metrics obtained via the link state protocol to determine a weight factor for each path of the set of paths comprises:

for each path, using one or more of the link-state metrics to determine a cost value for the respective path;

for each path, assigning the weight factor to the respective path using its cost value; and using the weight factors of the set of paths to distribute the one or more I/O tasks across the set of paths.

11. The information handling system of claim 8 wherein the step of using one or more of the link-state metrics from the sets of one or more link-state metrics obtained via the link state protocol to determine a weight factor for each path of the set of paths comprises:

for each link of a path, assigning or obtaining a cost value associated with one or more link-state metrics for the link, in which at least one of the one or more link-state metrics for the link is related to bandwidth;

given the cost value for each link in a path, determining a path cost value for the path;

combining the path cost values of all the paths in the set of paths to obtain a multipath cost value; and for a path in the set of paths, determining a weight factor based upon the multipath cost value divided by a product comprising number of hops for that path times its path cost value.

12. The information handling system of claim 8 wherein the non-transitory computer-readable medium or media further comprises one or more sequences of instructions which, when executed by at least one of the one or more processors, causes steps to be performed comprising:

responsive to detecting or identifying a change, updating weight factors; and using the updated weight factors to distribute one or more I/O tasks to one or more of the paths of the set of paths.

13. The information handling system of claim 12 wherein the change comprises one or more of the following comprising:

a change to one or more link-state metrics of one or more links;

a change to one or more link-state metrics of one or more paths;

a structural change to the network; and a functional change to the network.

14. The information handling system of claim 13 wherein the change comprises:

an addition of a new path, and the set of paths includes the new path as a member;

removal or inoperability of a path in the set of paths; or both.

15. A non-transitory computer-readable medium or media comprising one or more sequences of instructions which, when executed by at least one processor, causes steps to be performed comprising:

obtaining, via a link state protocol, a set of one or more link-state metrics for each path of a set of paths in a network that communicatively connects a host, which operates as a non-volatile memory express-over-Fabric (NVMe-oF) initiator implementing a storage protocol layer above a link-state protocol layer, and a storage subsystem, which operates as a NVMe target;

using one or more of the link-state metrics from the sets of one or more link-state metrics obtained via the link state protocol to determine a weight factor for each path of the set of paths; and distributing one or more input/output (I/O) tasks involving the host and the storage subsystem to one or more paths in the set of paths using the weight factors of the paths in the set of paths.

16. The non-transitory computer-readable medium or media of claim 15 wherein the step of distributing one or more input/output (I/O) tasks involving the host and the storage subsystem to one or more paths in the set of paths using the weight factors of the paths in the set of paths comprises:

hashing, using the weight factors, to determine a path on which to distribute one or more input/output tasks.

17. The non-transitory computer-readable medium or media of claim 15 wherein the step of using one or more of the link-state metrics from the sets of one or more link-state metrics obtained via the link state protocol to determine a weight factor for each path of the set of paths comprises:

for each path, using one or more of the link-state metrics to determine a cost value for the respective path;

for each path, assigning the weight factor to the respective path using its cost value; and using the weight factors of the set of paths to distribute the one or more I/O tasks across the set of paths.

18. The non-transitory computer-readable medium or media of claim 15 wherein the step of using one or more of the link-state metrics from the sets of one or more link-state metrics obtained via the link state protocol to determine a weight factor for each path of the set of paths comprises:

for each link of a path, assigning or obtaining a cost value associated with one or more link-state metrics for the link, in which at least one of the one or more link-state metrics for the link is related to bandwidth;

given the cost value for each link in a path, determining a path cost value for the path;

combining the path cost values of all the paths in the set of paths to obtain a multipath cost value; and for a path in the set of paths, determining a weight factor based upon the multipath cost value divided by a product comprising number of hops for that path times its path cost value.

19. The non-transitory computer-readable medium or media of claim 15 further comprising one or more sequences of instructions which, when executed by at least one processor, causes steps to be performed comprising:

responsive to detecting or identifying a change, updating weight factors; and using the updated weight factors to distribute one or more I/O tasks to one or more of the paths of the set of paths.

20. The non-transitory computer-readable medium or media of claim 19 wherein the change comprises one or more of the following comprising:

a change to one or more link-state metrics of one or more links;

a change to one or more link-state metrics of one or more paths;

a structural change to the network; and a functional change to the network.

* * * * *